(12) United States Patent
Nakahira et al.

(10) Patent No.: US 11,812,279 B2
(45) Date of Patent: Nov. 7, 2023

(54) WIRELESS BASE STATION INSTALLATION POSITION CALCULATION METHOD AND WIRELESS BASE STATION INSTALLATION POSITION CALCULATION SYSTEM

(71) Applicant: NIPPON TELEGRAPH AND TELEPHONE CORPORATION, Tokyo (JP)

(72) Inventors: Toshiro Nakahira, Musashino (JP); Hirantha Abeysekera, Musashino (JP); Shoko Shinohara, Musashino (JP); Yasuhiko Inoue, Musashino (JP); Koichi Ishihara, Musashino (JP); Takafumi Hayashi, Musashino (JP); Daisuke Goto, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 254 days.

(21) Appl. No.: 17/435,589

(22) PCT Filed: Feb. 25, 2020

(86) PCT No.: PCT/JP2020/007475
§ 371 (c)(1),
(2) Date: Sep. 1, 2021

(87) PCT Pub. No.: WO2020/179545
PCT Pub. Date: Sep. 10, 2020

(65) Prior Publication Data
US 2022/0159476 A1 May 19, 2022

(30) Foreign Application Priority Data
Mar. 4, 2019 (JP) ................................ 2019-039034

(51) Int. Cl.
*H04W 16/18* (2009.01)
*H04W 24/02* (2009.01)

(52) U.S. Cl.
CPC .......... *H04W 16/18* (2013.01); *H04W 24/02* (2013.01)

(58) Field of Classification Search
CPC ... H04W 84/045; H04W 16/22; H04W 16/32; H04W 24/02; H04W 16/18; H04W 16/20;
(Continued)

(56) References Cited

U.S. PATENT DOCUMENTS 9,374,721 B1 * 6/2016 Bales .................... H04W 24/02
9,560,531 B1 * 1/2017 Chang ................... H04W 52/18
(Continued)

OTHER PUBLICATIONS

IEEE Std 802.11-2016, Dec. 2016.
(Continued)

*Primary Examiner* — Matthew C Sams
(74) *Attorney, Agent, or Firm* — Harness, Dickey & Pierce, P.L.C.

(57) ABSTRACT

A method includes a step 1 of performing processing for determining wireless terminal stations that are inside cover areas of existing wireless base stations, and excluding the existing wireless base stations and the wireless terminal stations inside the cover areas from a wireless base station installation area, a step 2 of performing processing for optimizing, with respect to each first wireless terminal station that is outside the cover areas of the existing wireless base stations and has been left in the processing for excluding in the step 1, a combination of the first wireless terminal station and the closest additional wireless base station from which received power is the largest, and optimizing installation positions of additional wireless base stations, a step 3 of determining, with respect to the combinations of the additional wireless base stations and the first wireless ter- (Continued)

minal stations that were optimized in the step 2, whether wireless terminal stations are inside or outside cover areas of the additional wireless base stations, and performing processing for modifying an installation position of an additional wireless base station that accommodates a second wireless terminal station that is outside the cover area to increase the number of wireless terminal stations included in the cover areas.

9 Claims, 15 Drawing Sheets

(58) Field of Classification Search
CPC .... H04W 16/225; H04W 84/12; H04B 17/27; H04B 17/3912; H04L 41/12; H04L 41/147; H04J 11/005
See application file for complete search history.

(56) References Cited

U.S. PATENT DOCUMENTS

| | | | |
|---|---|---|---|
| 2013/0163565 A1* | 6/2013 | Lee | H04W 36/32 370/332 |
| 2016/0157106 A1* | 6/2016 | Randall | H04W 16/18 455/446 |
| 2016/0286408 A1* | 9/2016 | Qiu | H04W 24/02 |
| 2017/0105136 A1* | 4/2017 | Reider | H04W 24/10 |
| 2019/0200245 A1* | 6/2019 | Khan | H04W 24/02 |
| 2020/0169894 A1* | 5/2020 | Dillon | H04W 16/18 |
| 2022/0078630 A1* | 3/2022 | Toshinaga | H04W 16/18 |
| 2022/0110001 A1* | 4/2022 | Ginis | H04W 24/02 |
| 2022/0150715 A1* | 5/2022 | Nakahira | H04B 17/27 |
| 2022/0159476 A1* | 5/2022 | Nakahira | H04W 24/02 |

OTHER PUBLICATIONS

Arai Takuto, Goto Daisuke, Iwabuchi Masashi, Iwakuni Tatsuhiko, Maruta Kazuki, "Adaptive Movable Access Point System for Offloading Efficiency Enhancement", IEICE technical report, RCS2016-43, pp. 107-112, May 2016.

J. Macqueen, "Some Methods for Classification and Analysis of Multivariate Observations", Proc. of 5th Berkeley Symposium on Mathematical Statistics and Probability, pp. 281-297, 1967.

International Search Report Issued in PCT/JP2020/007475, dated Jun. 2, 2020.

* cited by examiner

Fig. 3

| SIZE | | | RADIO ENVIRONMENT INFORMATION | |
|---|---|---|---|---|
| WIDTH X(m) | LENGTH Y(m) | HEIGHT Z(m) | PROPAGATION ATTENUATION | ... |
| 2 | 8 | 2 | SQUARE ATTENUATION | |

Fig. 4

| AP NO. | AP TYPE | INSTALLATION POSITION | | | RADIO SETTINGS | | |
|---|---|---|---|---|---|---|---|
| | | WIDTH X(m) | LENGTH Y(m) | HEIGHT Z(m) | TRANSMISSION POWER (dBm) | MINIMUM TRANSMISSION RATE (Mbps) | ... |
| 1-1 | EXISTING | 2 | 8 | 3 | 20 | 6 | ... |
| ⋮ | ⋮ | ⋮ | ⋮ | ⋮ | ⋮ | ⋮ | ⋮ |
| 1-A | EXISTING | 6 | 1 | 3 | 20 | 6 | ... |
| 11-1 | ADDITIONAL | | | | | | |
| ⋮ | ⋮ | ⋮ | ⋮ | ⋮ | ⋮ | ⋮ | ⋮ |
| 11-C | ADDITIONAL | | | | | | |

Fig. 5

| STA NO. | CONNECTION DESTINATION AP | EXISTING AREA DETERMINATION | CLOSEST AP | INSTALLATION POSITION | | | RADIO SETTINGS | | |
|---|---|---|---|---|---|---|---|---|---|
| | | | | WIDTH X (m) | LENGTH Y (m) | HEIGHT Z (m) | TRANSMISSION POWER (dBm) | MINIMUM TRANSMISSION RATE (Mbps) | ... |
| 2-1 | 1-1 | INSIDE | 1-1 | 1 | 6 | 1 | 20 | 6 | ... |
| ⋮ | ⋮ | ⋮ | ⋮ | ⋮ | ⋮ | ⋮ | ⋮ | ⋮ | ⋮ |
| 2-B | NONE | OUTSIDE | 11-C | 9 | 5 | 1 | 20 | 6 | ... |

WIRELESS BASE STATION INSTALLATION POSITION CALCULATION METHOD AND WIRELESS BASE STATION INSTALLATION POSITION CALCULATION SYSTEM

CROSS-REFERENCE TO RELATED APPLICATIONS

This application is a 371 U.S. National Phase of International Application No. PCT/JP2020/007475 filed on Feb. 25, 2020 which claims priority to Japanese Application No. 2019-039034 filed on Mar. 4, 2019. The entire disclosures of the above applications are incorporated herein by reference.

TECHNICAL FIELD

The present invention relates to a wireless base station installation position computation method and a wireless base station installation position computation system for computing installation positions of wireless base stations that are additionally installed in an area of existing wireless base stations.

BACKGROUND ART

In recent years, users who use large-volume contents via wireless terminals are increasing along with rapid popularization of wireless terminals such as smartphones and tablets, and the volume of traffic in wireless networks is rapidly increasing. IEEE802.11 wireless LAN standard described in NPL 1, which is widely used as a high-speed wireless access system using radio waves in a band for which a wireless system license is unnecessary, is often used to easily accommodate radio traffic at a low cost. Wireless LAN networks are provided in various areas including private areas such as homes and offices and public areas such as stores, stations, and airports.

A wireless LAN network needs to be established with consideration given to various factors such as construction of wireless base stations, factors relating to wireless LAN communication such as parameter setting, factors relating to the network between a wireless base station and a switch and between a switch and a backhaul line, and factors relating to higher level services such as user authentication and portal screens. The present invention is focused on installation positions of wireless base stations in the construction of wireless base stations out of these factors.

In wireless communication, if a radio signal attenuates due to a propagation distance or an interrupting object, the quality or the volume of wireless communication is usually reduced, and therefore a state is desirable in which the distance between a wireless base station and a wireless terminal station is short and a propagation path is not obstructed. On the other hand, the number of wireless base stations that can be installed is limited due to costs required for devices, installation, and operation, radio wave interference, and the like, and therefore it is important to install a required number of wireless base stations at appropriate places in an area that is covered by a wireless LAN. Also, traffic and the number of users that can be accommodated by a single wireless base station are limited, and accordingly, an additional wireless base station may be installed as a result of an increase of wireless LAN users, and in such a case as well, design of an installation position of the additional wireless base station is important.

As a method for computing an installation position of a wireless base station, NPL 2 proposes a technology for dynamically changing positions of base station devices according to a change in a user distribution in an area, for example. Also, it has been considered accommodating terminal devices in base station devices using a clustering method called a k-means method described in NPL 3. Thus, an installation position of a wireless base station can be computed according to positions of users in an area.

CITATION LIST

Non Patent Literature

[NPL 1] IEEE Std 802.11-2016, December 2016.
[NPL 2] Arai Takuto, Goto Daisuke, Iwabuchi Masashi, Iwakuni Tatsuhiko, Maruta Kazuki, "Adaptive Movable Access Point System for Offloading Efficiency Enhancement", IEICE technical report, RCS2016-43, pp. 107-112, May, 2016.
[NFL 3] J. Macqueen, "SOME METHODS FOR CLASSIFICATION AND ANALYSIS OF MULTIVARIATE OBSERVATIONS", Proc. of 5th Berkeley Symposium on Mathematical Statistics and Probability, pp. 281-297, 1967.

SUMMARY OF THE INVENTION

Technical Problem

When installing additional wireless base stations in an area in which wireless base stations are already installed, it can be considered computing installation positions of the additional wireless base stations without changing installation positions of the existing wireless base stations. However, in the technology considered in NPL 2, it is assumed that all wireless base stations in an area are to be moved, and therefore, it is not possible with this technology to compute only installation positions of additional wireless base stations without moving existing wireless base stations, and providing a method for computing installation positions of the additional wireless base stations is an issue.

An object of the present invention is to provide a wireless base station installation position computation method and a wireless base station installation position computation system for computing optimum installation positions of wireless base stations that are additionally installed without moving existing wireless base stations.

Means for Solving the Problem

A first invention is a wireless base station installation position computation method for computing installation positions of additional wireless base stations that are to be additionally installed, without moving existing wireless base stations that are already installed in a wireless base station installation area, the wireless base station installation position computation method including: a step 1 of performing processing for determining wireless terminal stations that are inside cover areas of the existing wireless base stations, and excluding the existing wireless base stations and the wireless terminal stations inside the cover areas from the wireless base station installation area; a step 2 of performing processing for optimizing, with respect to each first wireless terminal station that is outside the cover areas of the existing wireless base stations and has been left in the processing for excluding in the step 1, a combination of the first wireless terminal station and the closest additional wireless base station from which received power is the largest, and optimizing installation positions of the additional wireless base stations; and a step 3 of determining, with respect to the combinations of the additional wireless base stations and the first wireless terminal stations that were optimized in the step 2, whether wireless terminal stations are inside or outside cover areas of the additional wireless base stations, and performing processing for modifying an installation position of an additional wireless base station that accommodates a second wireless terminal station that is outside the cover area to increase the number of wireless terminal stations included in the cover areas.

In the wireless base station installation position computation method of the first invention, in the step 1, a wireless terminal station is determined as being inside the cover areas of the existing wireless base stations if the largest value of received power from the existing wireless base stations at the wireless terminal station is greater than or equal to a threshold value, and a wireless terminal station is determined as being outside the cover areas of the existing wireless base stations if the largest value of received power from the existing wireless base stations at the wireless terminal station is smaller than the threshold value, and in the step 3, a first wireless terminal station is determined as being inside the cover areas of the additional wireless base stations if the largest value of received power from the additional wireless base stations at the first wireless terminal station is greater than or equal to a threshold value, and a first wireless terminal station is determined as being outside the cover areas of the additional wireless base stations if the largest value of received power from the additional wireless base stations at the first wireless terminal station is smaller than the threshold value.

In the wireless base station installation position computation method of the first invention, in the step 2, the processing for optimizing the combination of the additional wireless base station and the first wireless terminal station and optimizing the installation positions of the additional wireless base stations is performed by repeating processing for provisionally installing a predetermined number of additional wireless base stations in the wireless base station installation area, determining, for each first wireless terminal station, the closest additional wireless base station from which received power is the largest, and moving the closest additional wireless base station to an installation position at which the closest additional wireless base station efficiently accommodates the first wireless terminal station.

In the wireless base station installation position computation method of the first invention, in the step 3, the installation position of the additional wireless base station is provisionally moved until the second wireless terminal station is included in a cover area of the additional wireless base station, and if the number of wireless terminal stations included in the cover area of the additional wireless base station increases, the installation position of the additional wireless base station is set to the position after the provisional movement, and if the number of wireless terminal stations included in the cover area of the additional wireless base station does not increase, the installation position of the additional wireless base station is returned to the position before the provisional movement.

A second invention is a wireless base station installation position computation system for computing installation positions of additional wireless base stations that are to be additionally installed, without moving existing wireless base stations that are already installed in a wireless base station installation area, the wireless base station installation position computation system including: processing means 1 that performs processing for determining wireless terminal stations that are inside cover areas of the existing wireless base stations, and excluding the existing wireless base stations and the wireless terminal stations inside the cover areas from the wireless base station installation area; processing means 2 that performs processing for optimizing, with respect to each first wireless terminal station that is outside the cover areas of the existing wireless base stations and has been left in the processing for excluding performed by the processing means 1, a combination of the first wireless terminal station and the closest additional wireless base station from which received power is the largest, and optimizing installation positions of the additional wireless base stations; and processing means 3 that determines, with respect to the combinations of the additional wireless base stations and the first wireless terminal stations that were optimized by the processing means 2, whether wireless terminal stations are inside or outside cover areas of the additional wireless base stations, and performs processing for modifying an installation position of an additional wireless base station that accommodates a second wireless terminal station that is outside the cover area to increase the number of wireless terminal stations included in the cover areas.

In the wireless base station installation position computation system of the second invention, the processing means 1 determines that a wireless terminal station is inside the cover areas of the existing wireless base stations if the largest value of received power from the existing wireless base stations at the wireless terminal station is greater than or equal to a threshold value, and that a wireless terminal station is outside the cover areas of the existing wireless base stations if the largest value of received power from the existing wireless base stations at the wireless terminal station is smaller than the threshold value, and the processing means 3 determines that a first wireless terminal station is inside the cover areas of the additional wireless base stations if the largest value of received power from the additional wireless base stations at the first wireless terminal station is greater than or equal to a threshold value, and that a first wireless terminal station is outside the cover areas of the additional wireless base stations if the largest value of received power from the additional wireless base stations at the first wireless terminal station is smaller than the threshold value.

In the wireless base station installation position computation system of the second invention, the processing means 2 performs the processing for optimizing the combination of the additional wireless base station and the first wireless terminal station and optimizing the installation positions of the additional wireless base stations by repeating processing for provisionally installing a predetermined number of additional wireless base stations in the wireless base station installation area, determining, for each first wireless terminal station, the closest additional wireless base station from which received power is the largest, and moving the closest additional wireless base station to an installation position at which the closest additional wireless base station efficiently accommodates the first wireless terminal station.

In the wireless base station installation position computation system of the second invention, the processing means 3 provisionally moves the installation position of the additional wireless base station until the second wireless terminal station is included in a cover area of the additional wireless base station, and sets the installation position of the additional wireless base station to the position after the provisional movement if the number of wireless terminal stations included in the cover area of the additional wireless base station increases, and returns the installation position of the additional wireless base station to the position before the provisional movement if the number of wireless terminal stations included in the cover area of the additional wireless base station does not increase.

Effects of the Invention

In the present invention, wireless terminal stations in the wireless base station installation area are sorted into a group of wireless terminal stations that are to be connected to existing wireless base stations and a group of wireless terminal stations that are to be connected to additional wireless base stations, and installation positions of the additional wireless base stations are computed with respect to the group of wireless terminal stations to be connected to the additional wireless base stations, and thus, the installation positions of the additional wireless base stations can be computed giving consideration to cover areas of the existing wireless base stations.

BRIEF DESCRIPTION OF DRAWINGS

FIG. 3 is a diagram showing an example of wireless base station installation area information.

FIG. 4 is a diagram showing an example of wireless base station information.

FIG. 5 is a diagram showing an example of wireless terminal station information.

DESCRIPTION OF EMBODIMENTS

Figure 1:
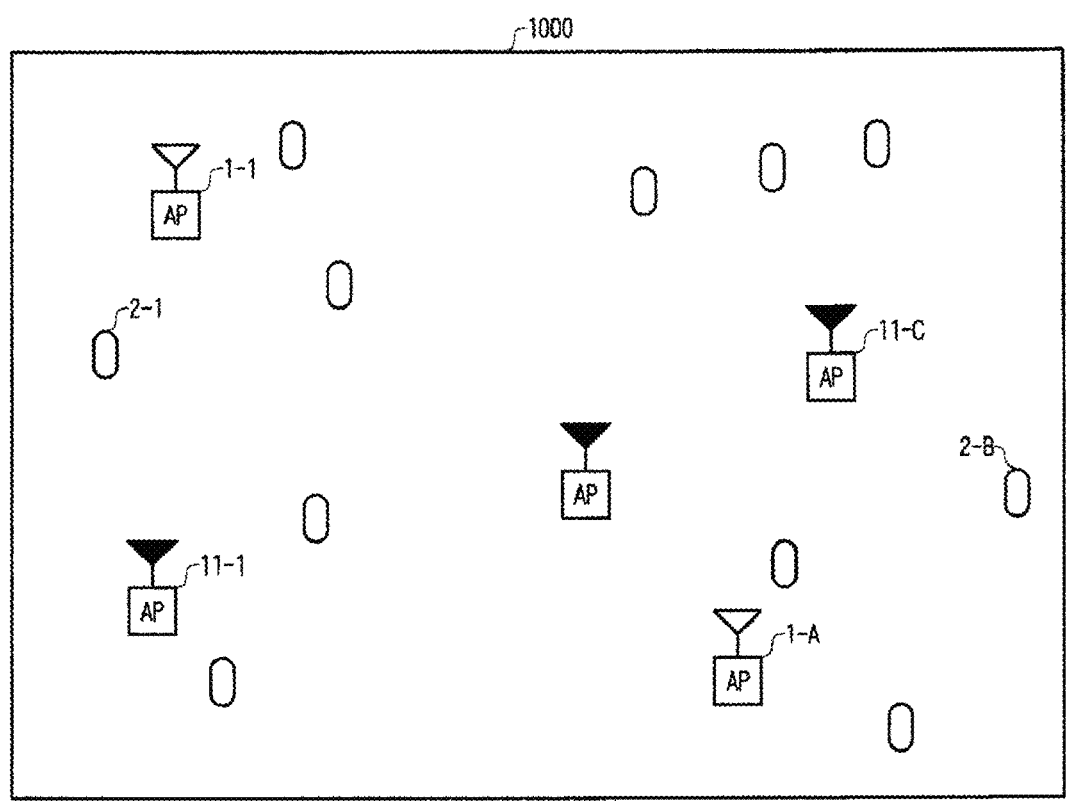
FIG. 1 shows an example arrangement of wireless base stations and wireless terminal stations in the present invention.

FIG. 1 shows an example arrangement of wireless base stations and wireless terminal stations in the present invention.

In a wireless base station installation area 1000 shown in FIG. 1, existing wireless base stations 1-1 to 1-A (A is an integer greater than or equal to 1) and wireless terminal stations 2-1 to 2-B (B is an integer greater than or equal to 1) are arranged, and additional wireless base stations 11-1 to 11-C (C is an integer greater than or equal to 1) are provisionally arranged. In the following description, the existing wireless base stations 1-1 to 1-A will be collectively referred to as "existing wireless base stations 1", the wireless terminal stations 2-1 to 2-B will be collectively referred to as "wireless terminal stations 2", and the additional wireless base stations 11-1 to 11-C will be collectively referred to as "additional wireless base stations 11".

Figure 2:
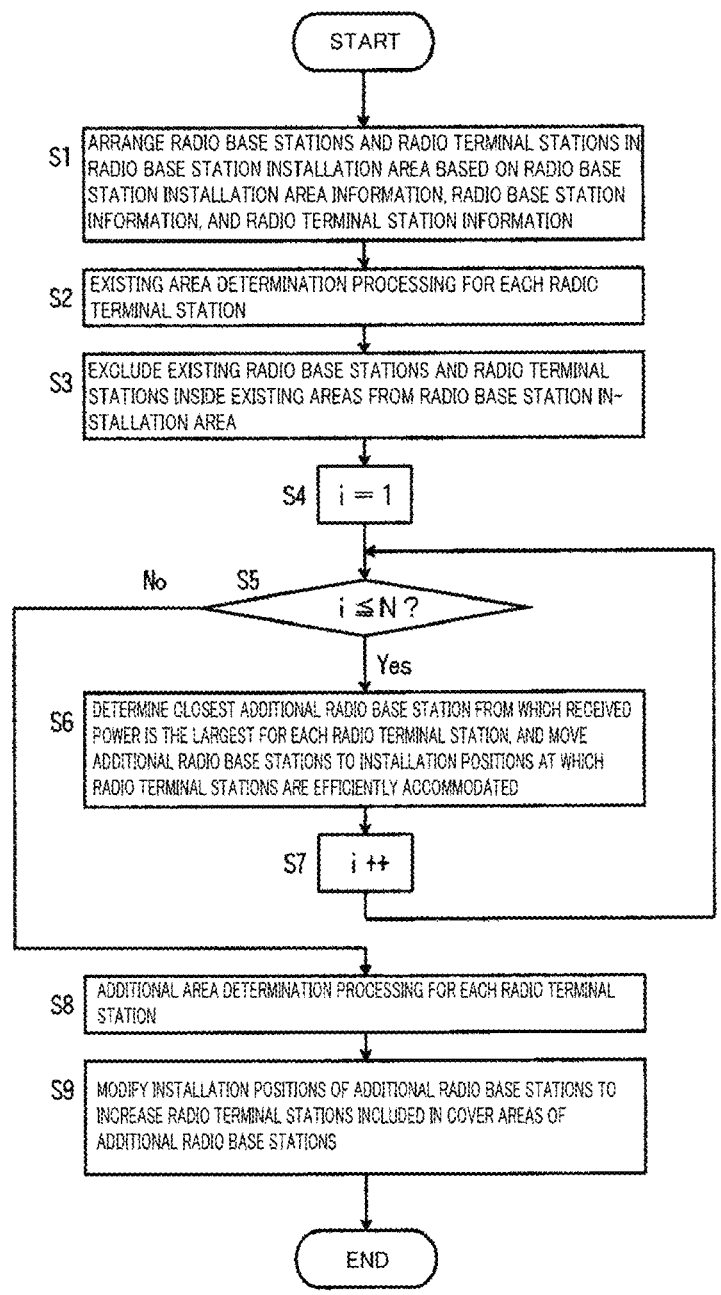
FIG. 2 is a flowchart showing an example of a whole processing procedure of a wireless base station installation position computation method according to the present invention.

FIG. 2 shows an example of a whole processing procedure of a wireless base station installation position computation method according to the present invention.

In wireless base station installation position computation processing shown in FIG. 2, wireless base stations and wireless terminal stations are arranged in a wireless base station installation area based on wireless base station installation area information, wireless base station information, and wireless terminal station information (step S1).

An example of the wireless base station installation area information is shown in FIG. 3, an example of the wireless base station information is shown in FIG. 4, and an example of the wireless terminal station information is shown in FIG. 5.

As shown in FIG. 3, the wireless base station installation area information includes, as information regarding the wireless base station installation area relating to the wireless base station installation position computation processing, a size (width, length, and height) and radio environment information such as propagation attenuation information, for example.

As shown in FIG. 4, the wireless base station information includes, as information regarding existing wireless base stations and additional wireless base stations relating to the wireless base station installation position computation processing, a number (AP number) of each wireless base station, a type (AP type: existing/additional) of each wireless base station, an installation position (coordinates in width, length, and height directions), and radio settings (transmission power value, minimum transmission rate, etc.), for example.

As shown in FIG. 5, the wireless terminal station information includes, as information regarding wireless terminals relating to the wireless base station installation position computation processing, a number (STA number) of each wireless terminal station, a connection destination wireless base station (connection destination AP), existing area determination information (inside/outside) indicating whether the wireless terminal station is inside or outside cover areas of existing wireless base stations, a wireless base station from which received power is the largest (closest AP), an installation position (coordinates in width, length, and height directions), and radio settings (transmission power value, minimum transmission rate, etc.), for example.

Step S1, step S2, and following steps shown in FIG. 2 are executed based on the above information.

First, existing area determination with respect to each wireless terminal station 2 is performed, i.e., wireless terminal stations 2 that exist inside the cover areas of existing wireless base stations 1 are determined (step S2), and all the existing wireless base stations 1 and the wireless terminal stations 2 that are determined as being inside the cover areas of the existing wireless base stations 1 are excluded from the wireless base station installation area 1000 (step S3). As a result of the processing in steps S2 and S3, wireless terminal stations 2 that are outside the cover areas of the existing wireless base stations 1 and additional wireless base stations 11 are left. Note that details of the processing in step S2 will be described later with reference to FIG. 6.

Next, an index value i (i represents an integer greater than or equal to 1) for repeated processing is set to 1 (step S4), and whether i is no greater than N (N is an integer greater than or equal to 1) is determined (step S5), N indicating the number of times of the repeated processing. If i is no greater than N (Yes in step S5), the closest additional wireless base station 11 from which received power is the largest is determined for each wireless terminal station 2 that is outside the cover areas of the existing wireless base stations 1 and has been left in the processing in step S3, and processing for moving installation positions of the additional wireless base stations 11 is performed such that each additional wireless base station 11 can efficiently accommodate wireless terminal stations 2 for which the additional wireless base station 11 is the closest additional wireless base station (step S6). Then, i is increased by 1 (step S7), the procedure returns to step S5, and thus the processing in step S6 is repeated N times, and then the procedure proceeds to step S8. As a result of the processing in step S6 being repeated, combinations of wireless terminal stations 2 and closest additional wireless base stations 11 are changed and arrangement of the additional wireless base stations 11 is optimized, but a configuration is also possible in which repetition of step S6 is ceased when the combinations do not change, and the procedure proceeds to step S8. Note that details of the processing in step S6 will be described later with reference to FIG. 7.

In step S8, additional area determination with respect to each wireless terminal station 2 is performed, i.e., wireless terminal stations 2 that are inside the cover areas of the additional wireless base stations 11 are determined. Note that this processing is processing in which the existing wireless base stations 1 in step S2 are replaced with the additional wireless base stations 11.

Next, processing for modifying installation positions of the additional wireless base stations 11 is performed to increase wireless terminal stations 2 included in the cover areas of the additional wireless base stations 11 (step S9), and the processing ends. Note that details of the processing in step S9 will be described later with reference to FIG. 8.

(Step S2)

Figure 6:
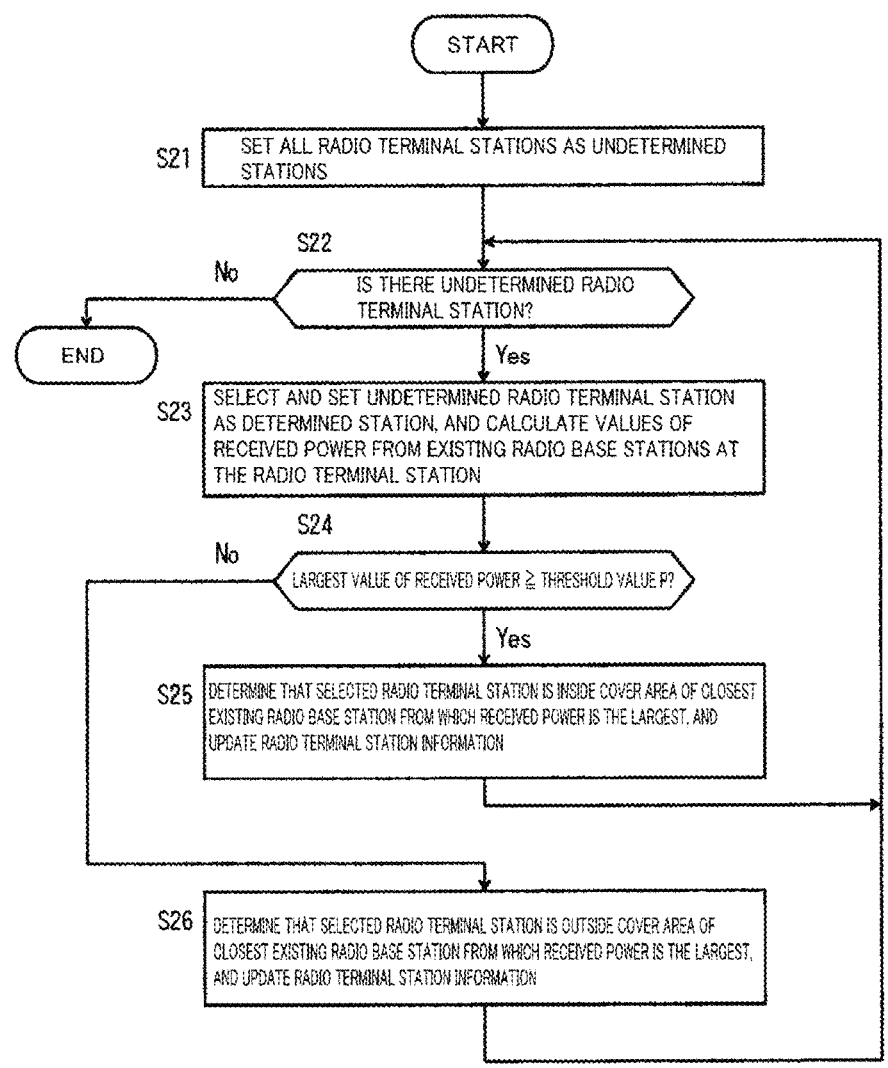
FIG. 6 is a flowchart showing an example of a detailed processing procedure of existing area determination with respect to wireless terminal stations (S2).

FIG. 6 shows a detailed processing procedure of existing area determination with respect to the wireless terminal stations 2 (step S2 in FIG. 2). Note that step S8 in FIG. 2 (additional area determination processing with respect to the wireless terminal stations 2) is similar processing, in which the existing wireless base stations 1 are replaced with the additional wireless base stations 11.

In FIG. 6, first, all wireless terminal stations 2 are set as undetermined wireless terminal stations (step S21). Next, whether there is an undetermined wireless terminal station is determined (step S22), and if there is an undetermined wireless terminal station (Yes in step S22), the procedure proceeds to step S23, and if there is no undetermined wireless terminal station (No in step S22), the processing ends.

In step S23, a wireless terminal station is selected from undetermined wireless terminal stations 2 and is set as a determined wireless terminal station, and values of received power from respective existing wireless base stations 1 are calculated with respect to the selected wireless terminal station 2'. Note that the values of received power can be calculated based on distances between the wireless terminal station 2' and the respective existing wireless base stations 1 and propagation attenuation included in the radio environment information of the wireless base station installation area information. However, the values of received power may also use data that is measured at the installation position of the wireless terminal station 2', or may also be calculated using another method.

Next, whether the largest value of the values of received power from the respective existing wireless base stations 1 calculated with respect to the wireless terminal station 2' is greater than or equal to a threshold value P that corresponds to cover areas of the existing wireless base stations 1 is determined (step S24), and if the largest value is greater than or equal to the threshold value P (Yes in step S24), it is determined that the wireless terminal station 2' is inside a cover area of the closest existing wireless base station 1 from which received power is the largest, information regarding the wireless terminal station 2' is updated in the wireless terminal station information (step S25), and the procedure returns to step S22. If the largest value of the values of received power from the respective existing wireless base stations 1 calculated with respect to the wireless terminal station 2' is smaller than the threshold value P (No in step S24), it is determined that the wireless terminal station 2' is outside the cover area of the closest existing wireless base station 1, information regarding the wireless terminal station 2' is updated in the wireless terminal station information (step S26), and the procedure returns to step S22.

Figure 9:
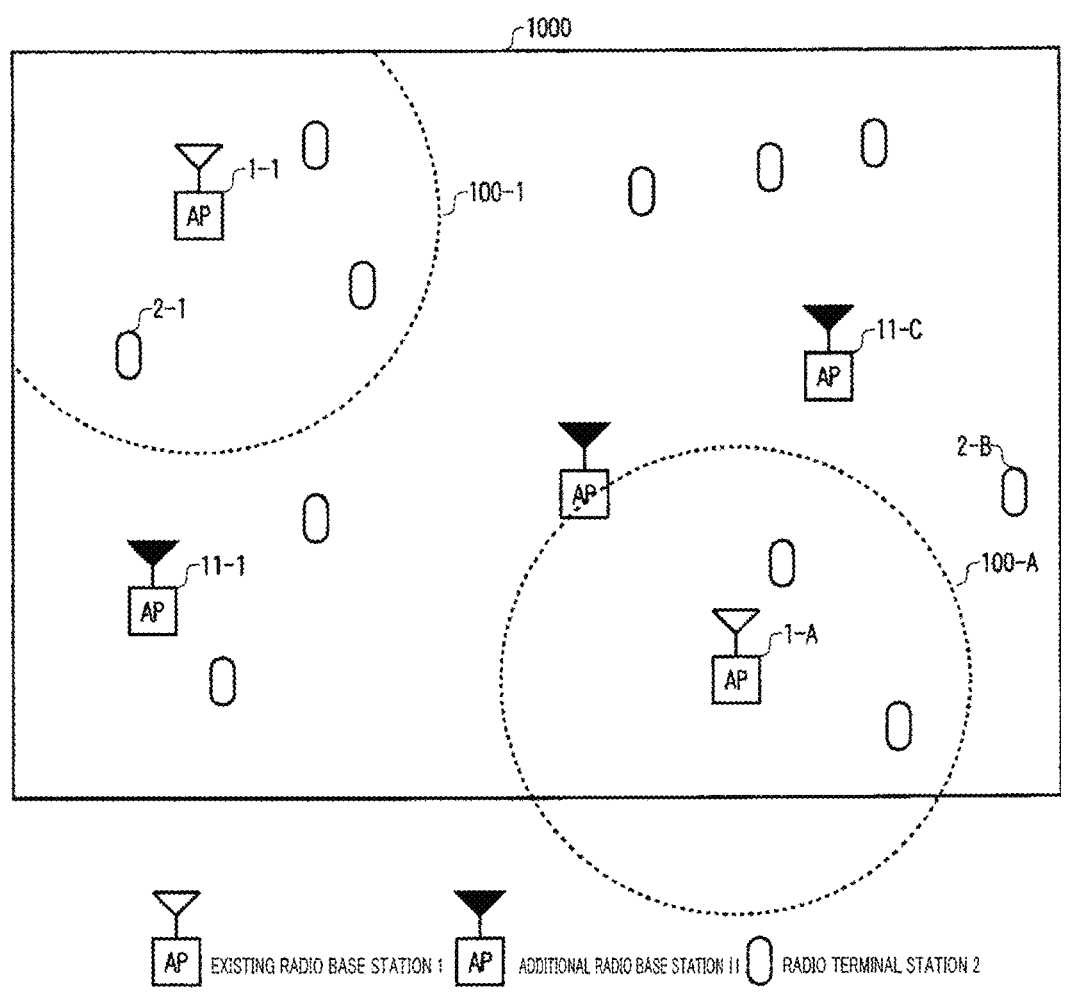
FIG. 9 is a diagram showing an example result of existing area determination with respect to wireless terminal stations (S2).

As a result of the processing in step S2 shown in FIG. 2, which is constituted by steps S21 to S26 described above, a wireless terminal station 2-1 that is inside a cover area 100-1 of an existing wireless base station 1-1 and a wireless terminal station 2-B that is outside a cover area 100-A of an existing wireless base station 1-A are sorted as shown in FIG. 9, with respect to the cover areas 100-1 to 100-A where the value of received power from the respective existing wireless base stations 1-1 to 1-A is the threshold value P.

Figure 10:
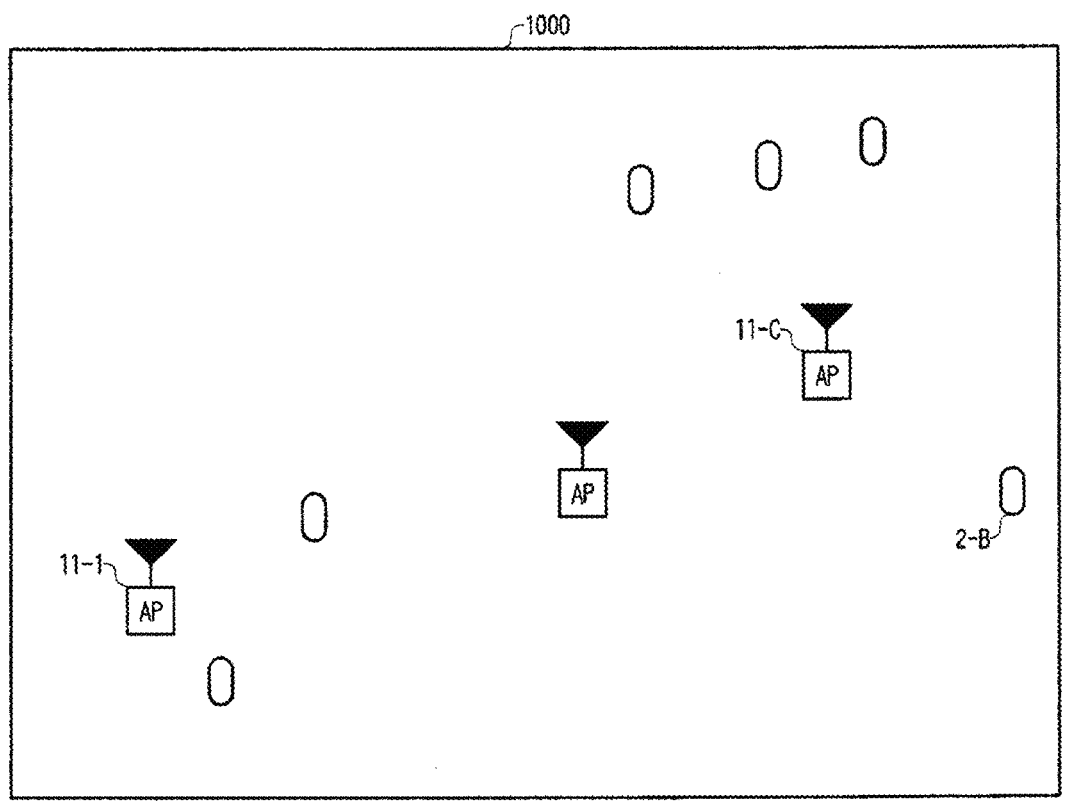
FIG. 10 is a diagram showing an example result of exclusion of existing wireless base stations and wireless terminal stations inside existing areas (S3).
Figure 10:

Then, as a result of all the existing wireless base stations 1 and wireless terminal stations 2 that are determined as being inside cover areas of the existing wireless base stations 1 being excluded from the wireless base station installation area 1000 in the processing in step S3 shown in FIG. 2, wireless terminal stations 2 that are outside the cover areas of the existing wireless base stations 1 and provisionally arranged additional wireless base stations 11 are left as shown in FIG. 10.

(Step S6)

Figure 7:
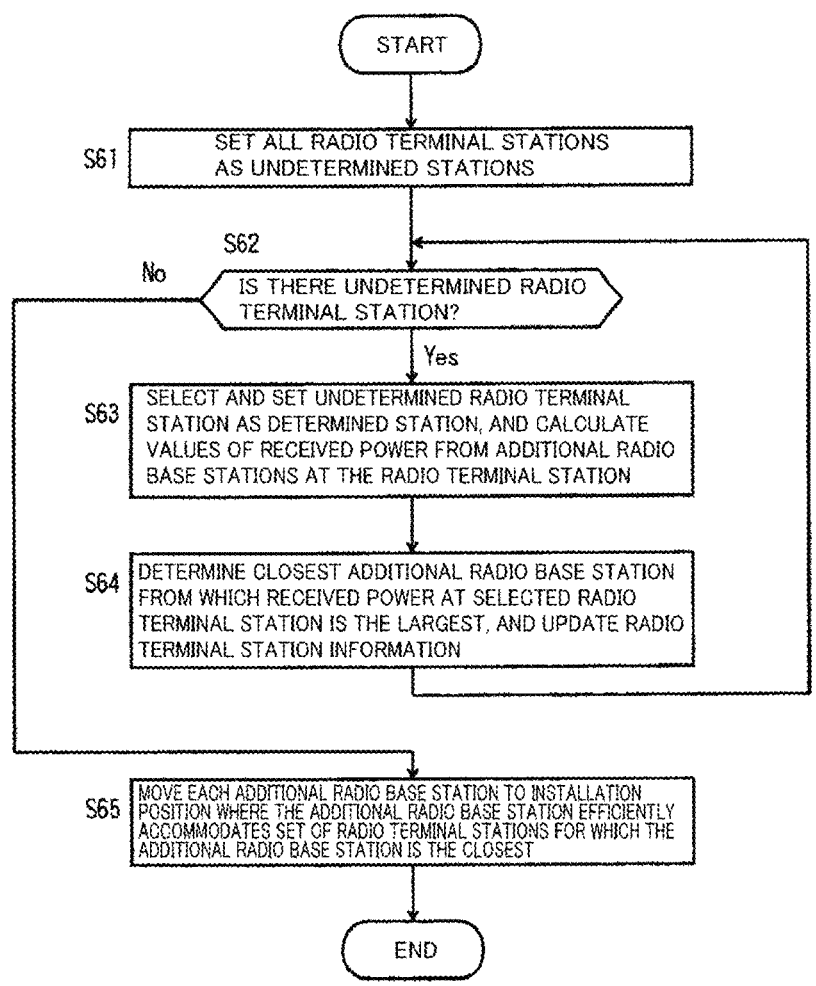
FIG. 7 is a flowchart showing an example of a detailed processing procedure of determination and movement of closest additional wireless base stations for wireless terminal stations (S6).

FIG. 7 shows an example of a detailed processing procedure of determination and movement of closest additional wireless base stations for wireless terminal stations (step S6 in FIG. 2).

In FIG. 7, first, all wireless terminal stations 2 are set as undetermined wireless terminal stations (step S61). Next, whether there is an undetermined wireless terminal station is determined (step S62), and if there is an undetermined wireless terminal station (Yes in step S62), the procedure proceeds to step S63, and if there is no undetermined wireless terminal station (No in step S62), the procedure proceeds to step S65.

In step S63, a wireless terminal station is selected from undetermined wireless terminal stations 2 and is set as a determined wireless terminal station, and values of received power from the respective additional wireless base stations 11 are calculated with respect to the selected wireless terminal station 2".

Next, the closest additional wireless base station 11 for which the value of received power is the largest among the values of received power from the respective additional wireless base stations 11 calculated with respect to the wireless terminal station 2" is determined, the wireless terminal station information is updated (step S64), and the procedure returns to step S62.

Figure 11:
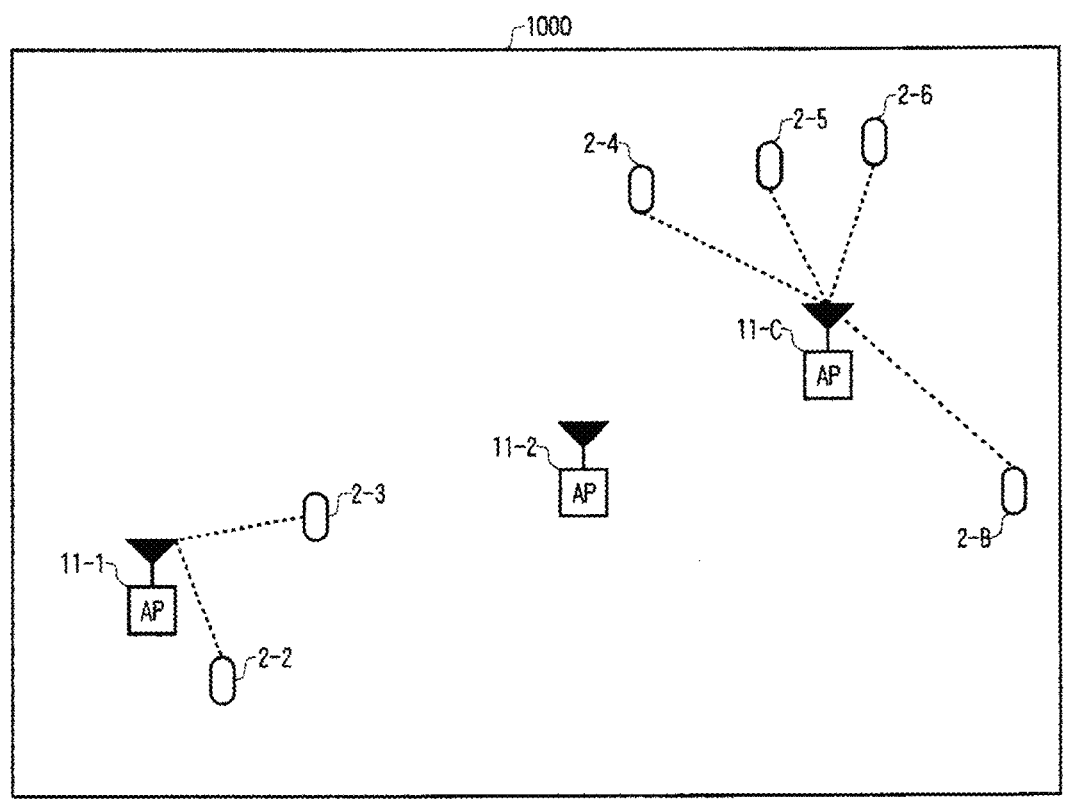
FIG. 11 is a diagram showing an example result of determination of closest additional wireless base stations for wireless terminal stations (S6, S64).

When the processing described above has been repeated and there is no undetermined wireless terminal station, the closest additional wireless base station 11 has been found for each wireless terminal station 2 that is outside the cover areas of the existing wireless base stations 1, and the procedure proceeds to step S65. This state is shown in FIG. 11 with dash lines between the additional wireless base stations 11-1 to 11-C and the wireless terminal stations 2-2 to 2-B. Here, the additional wireless base station 11-1 is the closest additional wireless base station for two wireless terminal stations 2-2 and 2-3, and the additional wireless base station 11-C is the closest additional wireless base station for four wireless terminal stations 2-4 to 2-B.

In step S65, the installation position of each additional wireless base station 11 is moved such that the additional wireless base station 11 can efficiently accommodate a set of wireless terminal stations 2 for which the additional wireless base station 11 is the closest additional wireless base station. Note that here, the installation position may be moved to a centroid position that is computed with respect to the set of wireless terminal stations 2 for which the additional wireless base station 11 is the closest additional wireless base station, or the position to which the installation position is moved may be computed based on values of received power at the wireless terminal stations 2.

Figure 12:
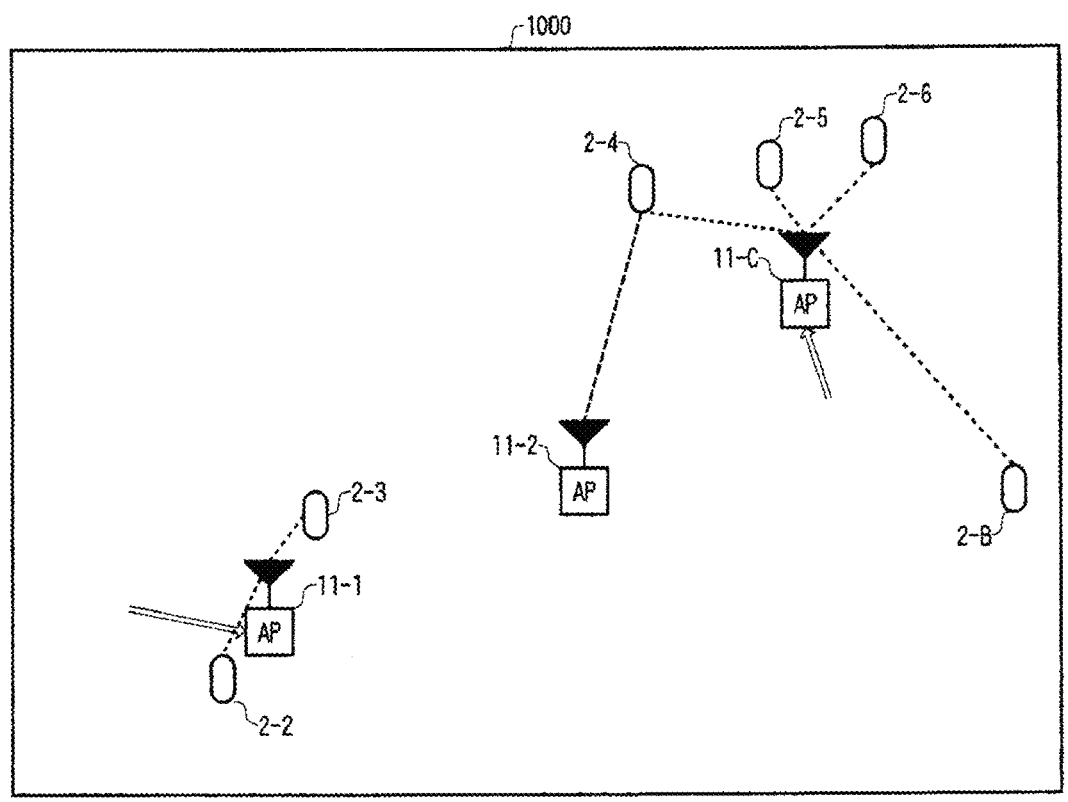
FIG. 12 is a diagram showing an example result of movement of closest additional wireless base stations for wireless terminal stations (S6, S65).

As a result of the processing in step S6 shown in FIG. 2, which is constituted by steps S61 to S65 described above, positions of the additional wireless base stations 11-1 and 11-C are adjusted as shown in FIGS. 11 and 12. Furthermore, as a result of the processing in step S6 being repeated, the installation positions of the additional wireless base stations 11 can be optimized while changing combinations of the wireless terminal stations 2 and the closest additional wireless base stations 11.

Figure 13:
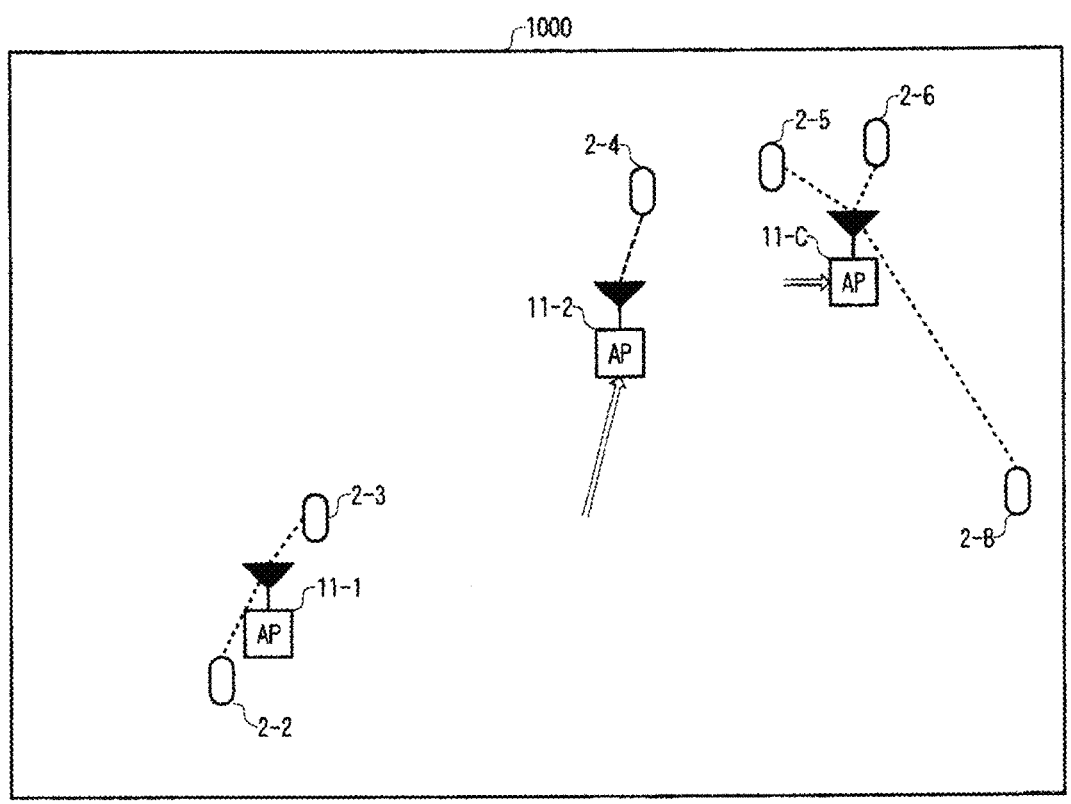
FIG. 13 is a diagram showing an example result of movement of an isolated additional wireless base station.
Figure 13:

Here, in a case where the wireless terminal stations 2-2 to 2-B that are outside the cover areas of the existing wireless base stations 1 are concentrated around specific additional wireless base stations 11-1 and 11-C as shown in FIG. 11, there may be an additional wireless base station 11-2 that is not the closest additional wireless base station for any of the wireless terminal stations 2. In this case, the processing for moving the installation position cannot be performed with respect to the additional wireless base station 11-2 in steps S64 and S65 shown in FIG. 7, and the additional wireless base station 11-2 is isolated. At this time, as shown in FIG. 12, it is conceivable finding a wireless terminal station 2-4 that is the closest wireless terminal station from the isolated additional wireless base station 11-2 from among the wireless terminal stations 2-2 to 2-B for which the other additional wireless base stations 11-1 and 11-C are the closest wireless base stations, and moving the additional wireless base station 11-2 toward the wireless terminal station 2-4. If the processing in step S6 shown in FIG. 2 (steps S61 to S65 shown in FIG. 7) is then repeated, combinations of the wireless terminal stations 2-2 to 2-B and the closest additional wireless base stations 11-1 to 11-C change as shown in FIG. 13, and the installation positions of the additional wireless base stations 11-1 to 11-C can be optimized.

Note that when the isolated additional wireless base station 11-2 is moved toward the wireless terminal station 2-4, whether the additional wireless base station 11-2 is moved to a position at which the closest additional wireless base station for the wireless terminal station 2-4 changes from the additional wireless base station 11-C to the additional wireless base station 11-2 or a position adjacent to the wireless terminal station 2-4 is suitably selected. In the latter case, if the closest additional wireless base station for the wireless terminal station 2-5 has changed from the additional wireless base station 11-C to the additional wireless base station 11-2 as a result of the movement, the additional wireless base station 11-2 moves to an intermediate position between the wireless terminal stations 2-4 and 2-5, and the additional wireless base station 11-C also moves to an intermediate position between the wireless terminal stations 2-6 and 2-B.

Figure 14:
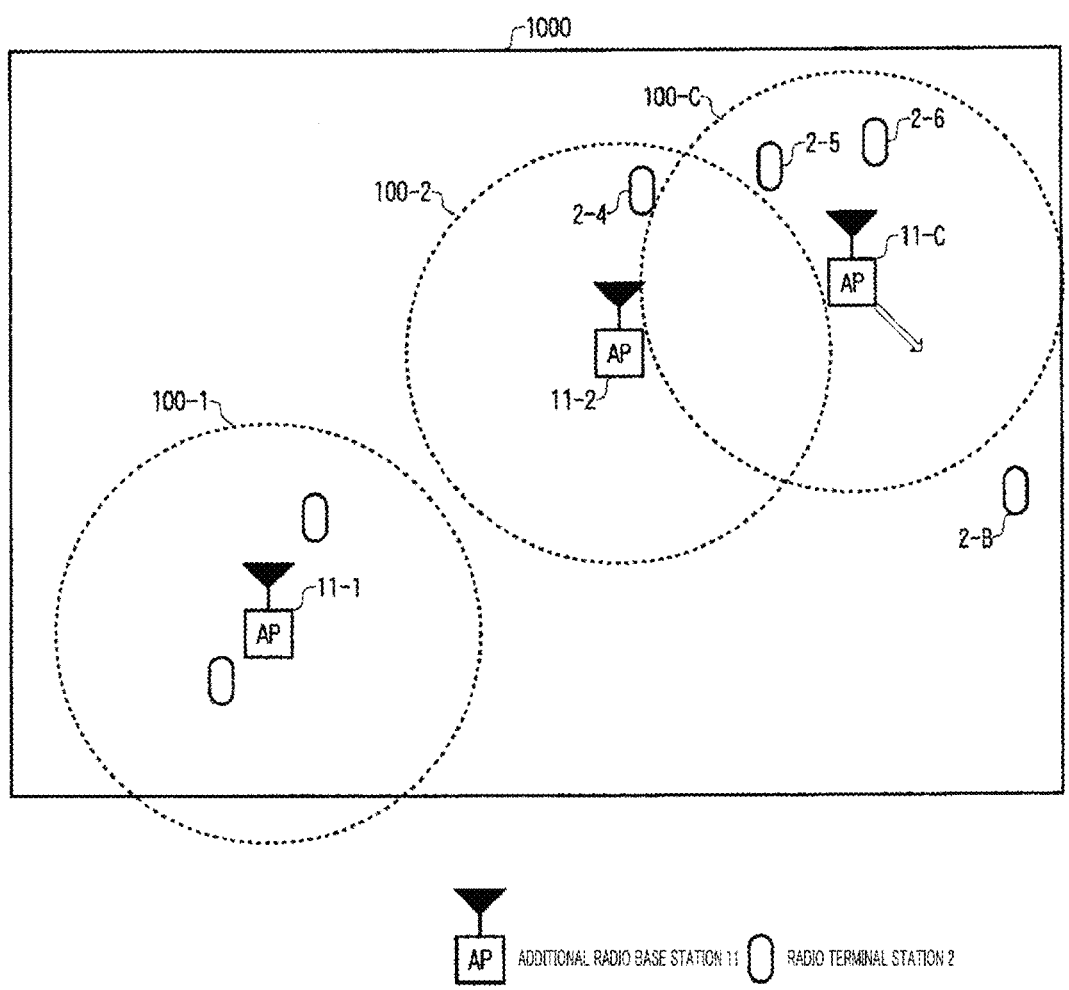
FIG. 14 is a diagram showing an example result of additional area determination with respect to wireless terminal stations (S8).

Incidentally, among the wireless terminal stations 2-2 to 2-B shown in FIG. 14, there may be a wireless terminal station such as the wireless terminal station 2-B that is outside the cover area 100-C of the closest wireless base station 11-C. The processing in steps S8 and S9 shown in FIG. 2 is performed to deal with such a situation.

(Step S9)

Figure 8:
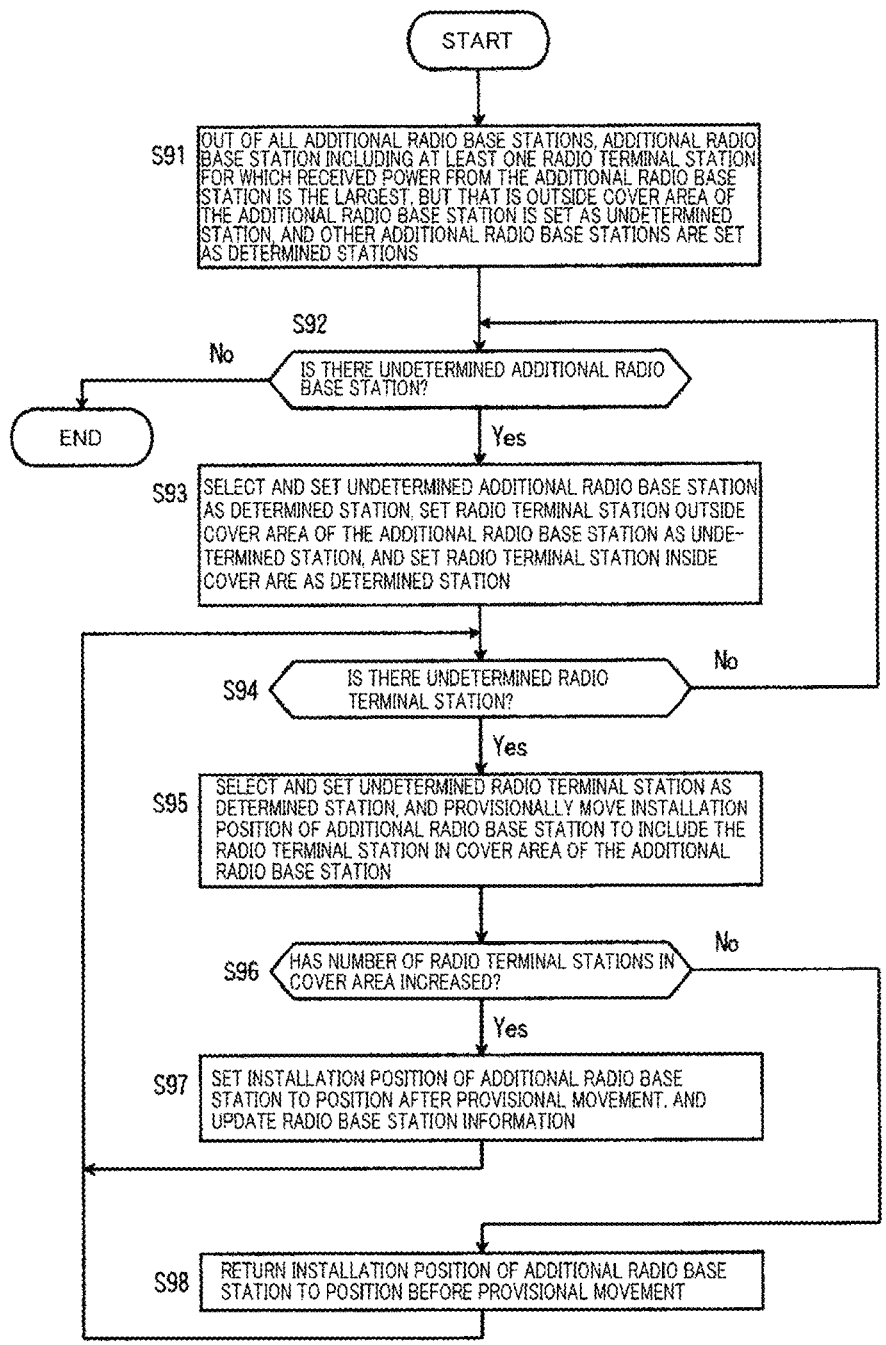
FIG. 8 is a flowchart showing an example of a detailed processing procedure of modification of installation positions of additional wireless base stations (S9).

FIG. 8 shows an example of a detailed procedure of modification of the installation position of the additional wireless base station 11-C that includes the wireless terminal station 2-B outside the cover area (step S9 in FIG. 2). Note that in the preceding step S8, the wireless terminal stations 2-5 and 2-6 that are inside the cover area of the additional wireless base station 11-C are determined through processing that is performed replacing the existing wireless base stations 1 with the additional wireless base stations 11 in the processing flow shown in FIG. 6 corresponding to step S2.

In FIG. 8, out of all the additional wireless base stations 11, each additional wireless base station 11 having at least one wireless terminal station 2 for which the value of received power from the additional wireless base station 11 is the largest (i.e., the additional wireless base station 11 is the closest additional wireless base station), but that is outside the cover area of the additional wireless base station 11 is set as an undetermined additional wireless base station, and the other additional wireless base stations 11 are set as determined additional wireless base stations (step S91). In the example shown in FIG. 14, the additional wireless base station 11-C having the wireless terminal station 2-B that is outside the cover area is set as an undetermined additional wireless base station.

Next, whether there is an undetermined additional wireless base station 11 is determined (step S92), and if there is an undetermined additional wireless base station (Yes in step S92), the procedure proceeds to step S93, and if there is no undetermined additional wireless base station (No in step S92), the processing ends.

In step S93, an additional wireless base station is selected from undetermined additional wireless base stations 11 and is set as a determined additional wireless base station, and out of wireless terminal stations 2 for which the selected additional wireless base station 11-C is the closest additional wireless base station, the wireless terminal station 2-B that is outside the cover area of the additional wireless base station 11-C is set as an undetermined wireless terminal station, and the other wireless terminal stations 2-5 and 2-6 are set as determined wireless terminal stations.

Next, whether there is an undetermined wireless terminal station 2 is determined (step S94), and if there is an undetermined wireless terminal station (Yes in step S94), the procedure proceeds to step S95, and if there is no undetermined wireless terminal station (No in step S94), the procedure returns to step S92.

In step S95, a wireless terminal station is selected from undetermined wireless terminal stations 2 and is set as a determined wireless terminal station, and the installation position of the additional wireless base station 11-C is provisionally moved such that the selected wireless terminal station 2-B is included in the cover area of the additional wireless base station 11-C. Here, the installation position of the additional wireless base station 11-C is provisionally moved toward the wireless terminal station 2-B until the wireless terminal station 2-B is included in the cover area of the additional wireless base station 11-C, or using another method.

Next, whether the number of wireless terminal stations 2 included in the cover area of the additional wireless base station 11-C has increased through the provisional movement is determined (step S96). If the number of wireless terminal stations 2 included in the cover area has increased (Yes in step S96), the installation position of the additional wireless base station 11-C is set to the position after the provisional movement and the wireless base station information is updated (step S97). If the number of wireless terminal stations 2 included in the cover area has not increased (No in step S96), the installation position of the additional wireless base station 11 is returned to the position before the provisional movement (step S98).

Figure 15:
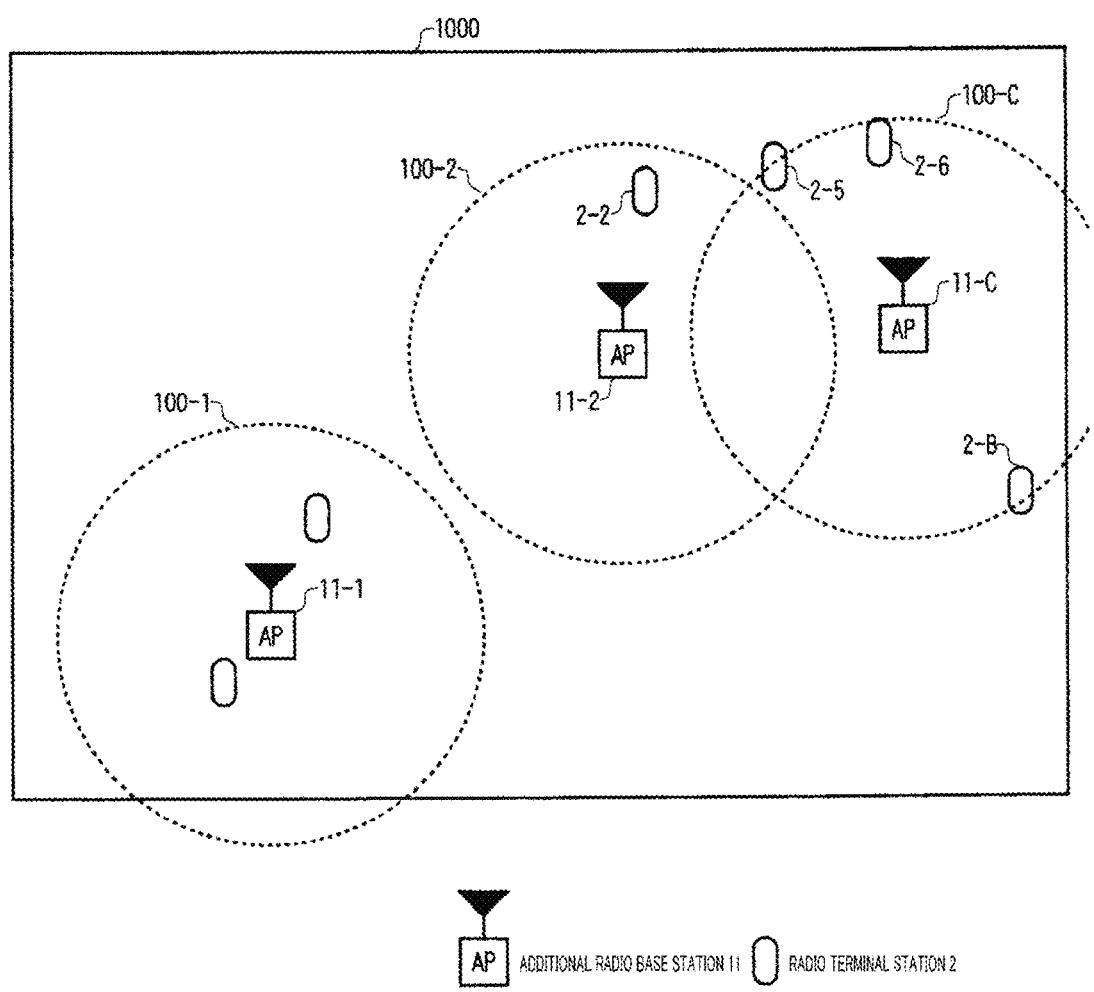
FIG. 15 is a diagram showing an example result of modification of an installation position of an additional wireless base station (S9).

For example, in FIG. 15, if the wireless terminal station 2-5 is outside the cover area 100-C of the additional wireless base station 11-C as a result of the additional wireless base station 11-C being moved to include the wireless terminal station 2-B in the cover area 100-C, the number of wireless terminal stations does not change, and therefore the additional wireless base station 11-C is returned to the position before the provisional movement.

The processing for modifying installation positions of the additional wireless base stations 11 in step S9 shown in FIG. 2 ends when there is no undetermined wireless terminal station 2 as a result of the processing in steps S94 to S98 described above being repeated, and there is no undetermined additional wireless base station 11 as a result of the processing in steps S92 to S93 being repeated. The result is shown in FIG. 15.

The processing in steps S1 to S9 shown in FIG. 2 and the detailed processing in steps S2, S6, and S9 described above are executed by a wireless base station installation position computation system that handles the wireless base station installation area information, the wireless base station information, and the wireless terminal station information, but the processing may also be implemented using a general-purpose computer.

In this case, a program for implementing functions may also be recorded in a computer-readable recording medium, and may also be implemented by causing a computer system to read and execute the program recorded in the recording medium. Note that the "computer system" referred to herein includes an OS and hardware such as peripheral devices. Also, the "computer-readable recording medium" refers to a portable medium such as a flexible disk, a magneto-optical disk, a ROM, or a CD-ROM, or a storage device such as a hard disk that is built in the computer system. Furthermore, the "computer-readable recording medium" may include recording mediums that dynamically hold the program for a short period of time such as a communication line in a case where the program is transmitted via a network such as the Internet or a communication line such as a telephone line, and recording mediums that hold the program for a certain period of time such as a volatile memory in a computer system that serves as a server or a client in that case. Also, the program described above may also be a program for implementing some of the functions described above, a program that can implement the functions described above in combination with a program that is already recorded in the computer system, or a program that is implemented using hardware such as a PLD (Programmable Logic Device) or an FPGA (Field Programmable Gate Array).

REFERENCE SIGNS LIST

1 Existing wireless base station
2 Wireless terminal station
11 Additional wireless base station
100 Cover area of existing/additional wireless base station
1000 Wireless base station installation area

The invention claimed is:

1. A wireless base station installation position computation method for computing installation positions of additional wireless base stations that are to be additionally installed, without moving existing wireless base stations that are already installed in a wireless base station installation area, the wireless base station installation position computation method comprising:
   a step 1 of performing processing for determining wireless terminal stations that are inside the cover areas of the existing wireless base stations, and excluding the existing wireless base stations and the wireless terminal stations inside the cover areas from the wireless base station installation area;
   a step 2 of performing processing for optimizing, with respect to each first wireless terminal station that is outside the cover areas of the existing wireless base stations and has been left as a result of the processing for excluding in the step 1, a combination of the first wireless terminal station and the closest additional wireless base station from which received power is the largest, and optimizing installation positions of the additional wireless base stations; and
   a step 3 of determining, with respect to the combinations of the additional wireless base stations and the first wireless terminal stations that were optimized in the step 2, wireless terminal stations that are inside and that are outside the cover areas of the additional wireless base stations, and performing processing for modifying an installation position of the additional wireless base station that accommodates a second wireless terminal station that is outside the cover area to increase the number of wireless terminal stations included in the cover areas.

2. The wireless base station installation position computation method according to claim 1, wherein
   in the step 1, a wireless terminal station is determined as being inside the cover areas of the existing wireless base stations if the largest value of received power from the existing wireless base stations at the wireless terminal station is greater than or equal to a threshold value, and a wireless terminal station is determined as being outside the cover areas of the existing wireless base stations if the largest value of received power from the existing wireless base stations at the wireless terminal station is smaller than the threshold value, and in the step 3, a first wireless terminal station is determined as being inside the cover areas of the additional wireless base stations if the largest value of received power from the additional wireless base stations at the first wireless terminal station is greater than or equal to a threshold value, and a first wireless terminal station is determined as being outside the cover areas of the additional wireless base stations if the largest value of received power from the additional wireless base stations at the first wireless terminal station is smaller than the threshold value.

3. The wireless base station installation position computation method according to claim 1, wherein in the step 2, the processing for optimizing the combination of the additional wireless base station and the first wireless terminal station and optimizing the installation positions of the additional wireless base stations is performed by repeating processing for provisionally installing a predetermined number of additional wireless base stations in the wireless base station installation area, determining, for each first wireless terminal station, the closest additional wireless base station from which received power is the largest, and moving the closest additional wireless base station to an installation position at which the closest additional wireless base station efficiently accommodates the first wireless terminal station.

4. The wireless base station installation position computation method according to claim 1, wherein in the step 3, the installation position of the additional wireless base station is provisionally moved until the second wireless terminal station is included in the cover area of the additional wireless base station, and if the number of wireless terminal stations included in the cover area of the additional wireless base station increases, the installation position of the additional wireless base station is set to the position after the provisional movement, and if the number of wireless terminal stations included in the cover area of the additional wireless base station does not increase, the installation position of the additional wireless base station is returned to the position before the provisional movement.

5. A wireless base station installation position computation system for computing installation positions of additional wireless base stations that are to be additionally installed, without moving existing wireless base stations that are already installed in a wireless base station installation area, the wireless base station installation position computation system comprising:

processing means 1 that performs processing for determining wireless terminal stations that are inside the cover areas of the existing wireless base stations, and excluding the existing wireless base stations and the wireless terminal stations inside the cover areas from the wireless base station installation area;

processing means 2 that performs processing for optimizing, with respect to each first wireless terminal station that is outside the cover areas of the existing wireless base stations and has been left as a result of the processing for excluding performed by the processing means 1, a combination of the first wireless terminal station and the closest additional wireless base station from which received power is the largest, and optimizing installation positions of the additional wireless base stations; and processing means 3 that determines, with respect to the combinations of the additional wireless base stations and the first wireless terminal stations that were optimized by the processing means 2, wireless terminal stations that are inside and that are outside the cover areas of the additional wireless base stations, and performs processing for modifying an installation position of the additional wireless base station that accommodates a second wireless terminal station that is outside the cover area to increase the number of wireless terminal stations included in the cover areas.

6. The wireless base station installation position computation system according to claim 5, wherein the processing means 1 determines that a wireless terminal station is inside the cover areas of the existing wireless base stations if the largest value of received power from the existing wireless base stations at the wireless terminal station is greater than or equal to a threshold value, and that a wireless terminal station is outside the cover areas of the existing wireless base stations if the largest value of received power from the existing wireless base stations at the wireless terminal station is smaller than the threshold value, and the processing means 3 determines that a first wireless terminal station is inside the cover areas of the additional wireless base stations if the largest value of received power from the additional wireless base stations at the first wireless terminal station is greater than or equal to a threshold value, and that a first wireless terminal station is outside the cover areas of the additional wireless base stations if the largest value of received power from the additional wireless base stations at the first wireless terminal station is smaller than the threshold value.

7. The wireless base station installation position computation system according to claim 5, wherein the processing means 2 performs the processing for optimizing the combination of the additional wireless base station and the first wireless terminal station and optimizing the installation positions of the additional wireless base stations by repeating processing for provisionally installing a predetermined number of additional wireless base stations in the wireless base station installation area, determining, for each first wireless terminal station, the closest additional wireless base station from which received power is the largest, and moving the closest additional wireless base station to an installation position at which the closest additional wireless base station efficiently accommodates the first wireless terminal station.

8. The wireless base station installation position computation system according to claim 5, wherein the processing means 3 provisionally moves the installation position of the additional wireless base station until the second wireless terminal station is included in the cover area of the additional wireless base station, and sets the installation position of the additional wireless base station to the position after the provisional movement if the number of wireless terminal stations included in the cover area of the additional wireless base station increases, and returns the installation position of the additional wireless base station to the position before the provisional movement if the number of wireless terminal stations included in the cover area of the additional wireless base station does not increase.

9. A wireless base station installation position computation system for computing installation positions of additional wireless base stations that are to be additionally installed, without moving existing wireless base stations that are already installed in a wireless base station installation area, the wireless base station installation position computation system comprising a computer unit, said computer unit is configured to execute:

determining wireless terminal stations that are inside the cover areas of the existing wireless base stations;

excluding the existing wireless base stations and the wireless terminal stations inside the cover areas from the wireless base station installation area;

optimizing, with respect to each first wireless terminal station that is outside the cover areas of the existing wireless base stations and has been left as a result of said processing of excluding, a combination of the first wireless terminal station and the closest additional wireless base station from which received power is the largest, and installation positions of the additional wireless base stations;

determining, with respect to the combinations of the additional wireless base stations and the first wireless terminal stations that were optimized by said processing of optimizing, wireless terminal stations that are inside and that are outside the cover areas of the additional wireless base stations, and modifying an installation position of the additional wireless base station that accommodates a second wireless terminal station that is outside the cover area to increase the number of wireless terminal stations included in the cover areas.

* * * * *